(12) United States Patent
Steven

(10) Patent No.: US 10,415,203 B2
(45) Date of Patent: Sep. 17, 2019

(54) ENGAGING APPARATUS

(71) Applicant: Cedeco Contractors Limited, Hamilton (GB)

(72) Inventor: Iain Steven, Hamilton (GB)

(73) Assignee: CEDECO CONTRACTORS LIMITED, Hamilton (GB)

( * ) Notice: Subject to any disclaimer, the term of this patent is extended or adjusted under 35 U.S.C. 154(b) by 76 days.

(21) Appl. No.: 15/520,763

(22) PCT Filed: Oct. 20, 2015

(86) PCT No.: PCT/GB2015/053120
§ 371 (c)(1),
(2) Date: Apr. 20, 2017

(87) PCT Pub. No.: WO2016/063032
PCT Pub. Date: Apr. 28, 2016

(65) Prior Publication Data
US 2017/0314224 A1 Nov. 2, 2017

(30) Foreign Application Priority Data
Oct. 20, 2014 (GB) .................................. 1418635.7

(51) Int. Cl.
*E02B 17/06* (2006.01)
*E02B 17/08* (2006.01)
(Continued)

(52) U.S. Cl.
CPC ................ *E02B 17/06* (2013.01); *B66C 1/44* (2013.01); *E02B 17/0854* (2013.01); *F16D 63/006* (2013.01)

(58) Field of Classification Search
CPC .... E02B 17/06; E02B 17/0854; F16D 63/006; B66C 1/44
See application file for complete search history.

(56) References Cited

U.S. PATENT DOCUMENTS 2,969,648 A    1/1961   Rechtin
4,367,056 A *   1/1983   Seneviratne ........ E02B 17/0854
                                                   254/106
(Continued)

FOREIGN PATENT DOCUMENTS

JP      48-51455      7/1973
JP      58-44115 A    3/1983
(Continued)

OTHER PUBLICATIONS

International Search Report and Written Opinion for corresponding PCT Application No. PCT/GB2015/053120.

*Primary Examiner* — Vicky A Johnson
(74) *Attorney, Agent, or Firm* — Tarolli, Sundheim, Covell & Tummino LLP

(57) ABSTRACT

The present invention relates to an apparatus for engaging a first body with a second body, for example, for locking an oil rig platform to a rig leg. The apparatus comprises a driving portion, for example in the form of a driving wedge, which is moveably attachable to the first body, and an engaging portion, for example in the form of an engaging wedge, which is moveably attached to the driving portion. The driving portion is adapted to move in a first direction with respect to the second body and the engaging portion defines an engaging profile adapted to engage a complementary profile on the second body. Movement of the driving portion results in movement of the engaging portion. The apparatus also comprises an adjustment device connecting the driving portion to the engaging portion and adapted to move the engaging portion independently of the driving portion.

20 Claims, 13 Drawing Sheets

(51) Int. Cl.
*B66C 1/44* (2006.01)
*F16D 63/00* (2006.01)

(56) References Cited

U.S. PATENT DOCUMENTS

| | | | | |
|---|---|---|---|---|
| 4,405,115 A | * | 9/1983 | Boyadjieff | E02B 17/0854 |
| | | | | 254/106 |
| 5,611,645 A | * | 3/1997 | Breeden | E02B 17/06 |
| | | | | 405/195.1 |
| 5,915,882 A | * | 6/1999 | Darwiche | E02B 17/06 |
| | | | | 405/198 |
| 6,030,149 A | * | 2/2000 | Foo | E02B 17/06 |
| | | | | 254/112 |
| 2005/0260040 A1 | * | 11/2005 | Ingle | E02B 17/021 |
| | | | | 405/198 |

FOREIGN PATENT DOCUMENTS

| | | |
|---|---|---|
| JP | 58-160427 A | 9/1983 |
| JP | 61-68921 A | 4/1986 |
| WO | 2014/126465 A1 | 8/2014 |

* cited by examiner

ENGAGING APPARATUS

RELATED APPLICATIONS

The present application is a U.S. National Stage Application under 35 USC 371, claiming priority to PCT Serial No. PCT/GB2015/053120, filed on Oct. 20, 2015; which claims priority to Great Britain Patent Application Serial No. 1418635.7, filed on Oct. 20, 2014, the entirety of all of which are incorporated herein by reference.

FIELD OF THE INVENTION

The present invention relates to an apparatus for engaging a first body with a second body. Particularly, but not exclusively the present invention relates to an apparatus for engaging a platform with the leg of an oil rig.

BACKGROUND TO THE INVENTION

Jack-up rigs are widely used in offshore environments where a stable vessel is required to perform an operation such as maintenance of an offshore structure.

A jack-up rig is a floating vessel which can be sailed into position above or adjacent to an offshore structure. Once in position, the jack-up rig's legs are lowered into engagement with the seabed. Once securely standing on the seabed, the hull can be raised out of the water and secured with respect to the legs of the vessel.

The relative movement between the legs and the hull of the jack-up rig is achieved by a rack and pinion type arrangement. Each leg defines a rack gear which engages with a pinion gear attached to the hull. Each pinion gear is rotated with respect to its associated rack creating relative movement, in the first instance to lower the legs to the seabed and in the second instance to raise the hull out of the water. Once these manoeuvres are completed, the pinion gear is held stationary thereby preventing further movements of the legs with respect to the hull.

This arrangement has drawbacks, for example, the wear on each of the pinion gears and the associated reduction gearbox can be considerable requiring regular replacement of the pinion gears and overhaul or replacement of the gearbox.

Additionally, the rack and pinion arrangement requires the pinion gears to be locked in position to prevent relative movement between the hull and the legs. Failure of this engaging relationship can result in catastrophic consequences.

Other systems of moving and engaging the hull with respect to the legs using linear rather than rotational engagement are known, however these systems encounter time-consuming difficulties associated with aligning the respective components when the components engage and disengage.

SUMMARY OF THE INVENTION

According to a first aspect of the present invention there is provided an apparatus for engaging a first body to a second body, the apparatus comprising:

a driving portion moveably attachable to the first body, the driving portion;

an engaging portion moveably attached to the driving portion, such that movement of the driving portion results in movement of the engaging portion, the engaging portion defining an engaging profile, the engaging profile adapted to engage a complementary profile on the second body, and an adjustment device connecting the driving portion to the engaging portion, the adjustment device being adapted to move the engaging portion independently of the driving portion.

In at least one embodiment of the present invention, by providing the ability to move the engaging portion independently of the driving portion allows for the engaging profile and a complimentary profile on the second body to be aligned prior to engagement thereby facilitating the engaging process. Once engaged, the apparatus can be used to lock the first body with respect to the second body, or can be used to create relative movement between the first body and the second body.

The adjustment device may be adapted to restrict movement of the engaging portion to movement along a particular axis.

In one embodiment, the adjustment device may be adapted to restrict movement of the engaging portion to movement in a direction perpendicular, in use, to the second body profile. By restricting movement of the engaging portion to a particular axis, and in one embodiment, to a direction perpendicular to the second body profile permits the operator to maintain the alignment of the engaging profiles as they are brought into engagement. This speeds up the entire engagement process as once the profiles are aligned, no further checks are required as the profiles are engaged.

The driving portion may be adapted to move in a first direction.

The first direction may be parallel, in use, to a second body longitudinal axis.

The driving portion may be adapted to engage the engaging portion.

The driving portion may be adapted to engage the engaging portion at an apparatus interface.

The driving portion may define a driving portion tapered surface.

The engaging portion may define an engaging portion tapered surface.

The driving portion tapered surface and the engaging portion tapered surface may be adapted to engage to define the apparatus interface.

The portion tapered surfaces may be adapted to engage such that movement of the driving portion in the first direction results in movement of the engaging portion in a second direction, the first direction being different to the second direction.

The driving portion tapered surface and the engaging portion tapered surface may be planar.

The driving portion tapered surface and the engaging portion tapered surface may be parallel planes.

The apparatus may define a lubrication system.

The lubrication system may be adapted to lubricate the apparatus interface.

At least one of the driving portion tapered surface and or the engaging portion tapered surface may define a surface profile.

The/each surface profile may define one or more recesses.

The/each surface profile recess may be a passageways.

The lubrication system may be adapted to the lubricant into the/each surface profile.

The passageways may be fed with lubricant. The provision of passageways to allow the supply of lubricant/grease assist in lubricating the interface between the driven portion and the engaging portion.

The adjustment device may be adapted to prevent movement of the engaging portion in the first direction. When tapered surfaces are used, such an arrangement restricts movement of the engaging portion to the component of movement, applied by the taper on the driving portion, which is perpendicular to the first direction.

The driving portion may define a land adapted to be engaged by the engaging portion.

The engaging portion may define a land adapted to be engaged by the driving portion. Providing one or other or both of the driving portion or the engaging portion with a land against which the other portion engages, restricts the extent of travel of the engaging portion, in use, towards the second body. This prevents the apparatus from being exposed to excessive compressive or bending forces through engagement with the second body.

The engaging portion and/or the driving portion may define a recess adapted to receive the adjustment device.

The adjustment device may be a hydraulic cylinder.

In alternative embodiments, the adjustment device may be electrically or hydraulically driven mechanical screw jack.

The adjustment device may be adapted to move between a retracted position and an extended position.

Movement from the retracted position to the extended position may be along an axis parallel to the first direction. Movement in this direction facilitates the adjustment device compensating for the movement of the driving portion in the first direction when it is desired to prevent the engaging portion from moving in the first direction.

The driving portion may be moved with respect to the first body by means of a first force application device.

The first force application device may be hydraulically driven.

The first force application device may be a first hydraulic screw jack.

Alternatively, the first force application device may be a first hydraulic cylinder.

The first force application device may be applied to the driving portion until the engaging portion profile has fully engaged with the second body complementary profile.

Alternatively or additionally the first force application device may be applied to the driving portion until the driving portion land and the engaging portion land are engaged with the engaging portion and driving portion respectively.

Once the engaging portion profile has fully engaged with the second body complementary profile, maintaining the position of the first force application device in the first direction will maintain the locking portion in an engaged position, thereby locking the first body with respect to the second body.

Further application of force by the first force application device may be adapted to create relative movement between the first body and the second body. Such an arrangement allows for a jacking mechanism to be created.

The apparatus may comprise a second force application device.

The second force application device may be hydraulically driven.

The second force application device may be a second hydraulic screw jack.

Alternatively, the second force application device may be a second hydraulic cylinder.

The second force application device may be engageable with the engaging portion.

The surface profile may define passageways.

The passageways may be fed with grease. The provision of passageways to allow the supply of grease assist in lubricating the interface between the driven portion and the engaging portion.

According to a second aspect of the present invention there is provided a method of engaging a first body with respect to a second body the method comprising the steps of:

moving an engaging portion defining an engaging profile in a first direction into alignment with a complimentary profile on the second body;

moving a driving portion in the first direction into engagement with the engaging portion, an adjustment device connecting the driving portion to the engaging portion preventing movement of the engaging portion in the first direction;

continuing to move the driving portion in the first direction, movement of the driving portion resulting in movement of the engaging portion in a direction perpendicular to the first direction such that the engaging portion engaging profile engages the second body profile.

According to a third aspect of the present invention there is provided an apparatus for engaging a first body to a second body, the apparatus comprising:

a driving wedge moveably attachable to the first body, the driving wedge defining a driving wedge tapered surface;

a engaging wedge moveably attached to the driving wedge, the engaging wedge defining a engaging profile, the engaging profile adapted to engage a complementary profile on the second body, the engaging wedge defining a engaging wedge tapered surface, and an adjustment device connecting the driving wedge to the engaging wedge;

wherein the tapered surfaces and the adjustment device are arranged such that movement in a first direction of the driving wedge results in movement in a second direction of the engaging wedge, the second direction being perpendicular to the first direction.

According to a fourth aspect of the present invention there is provided a method of creating relative movement between a first body and a second body, the method comprising the steps of:

moving a first engaging portion defining a first engaging profile in a first direction into alignment with a complimentary profile on the second body;

moving a first driving portion in the first direction into engagement with the first engaging portion, a first adjustment device connecting the first driving portion to the first engaging portion preventing movement of the first engaging portion in the first direction;

continuing to move the first driving portion in the first direction, movement of the first driving portion resulting in movement of the first engaging portion in a direction perpendicular to the first direction such that the first engaging portion engaging profile engages the second body profile; and further continuing to move the first driving portion in the first direction, movement of the first driving portion resulting in movement of the first body with respect to the second body.

In at least one embodiment the first driving portion may have an extent of travel.

In this embodiment at the extent of travel the method may comprise a further step of moving a second engaging portion defining a second engaging profile in a first direction into alignment with the second body profile;

moving a second driving portion in the first direction into engagement with the second engaging portion, a second adjustment device connecting the second driving portion to the second engaging portion preventing movement of the second engaging portion in the first direction;

continuing to move the second driving portion in the first direction, movement of the second driving portion resulting in movement of the second engaging portion in a direction perpendicular to the first direction such that the second engaging portion engaging profile engages the second body profile;

disengaging the first engaging portion from the second body; and further continuing to move the second driving portion in the first direction, movement of the second driving portion resulting in further movement of the first body with respect to the second body.

Alternating engagement and disengagement of a pair of engagement apparatus allows for jacking of the first body with respect to a second body over any required distance.

BRIEF DESCRIPTION OF THE DRAWINGS

Embodiments of the present invention will now be described with reference to the accompanying Figures in which:

FIG. 4 a is a close-up of part of FIG. 4;

DETAILED DESCRIPTION OF THE DRAWINGS

Figures 1, 1A:
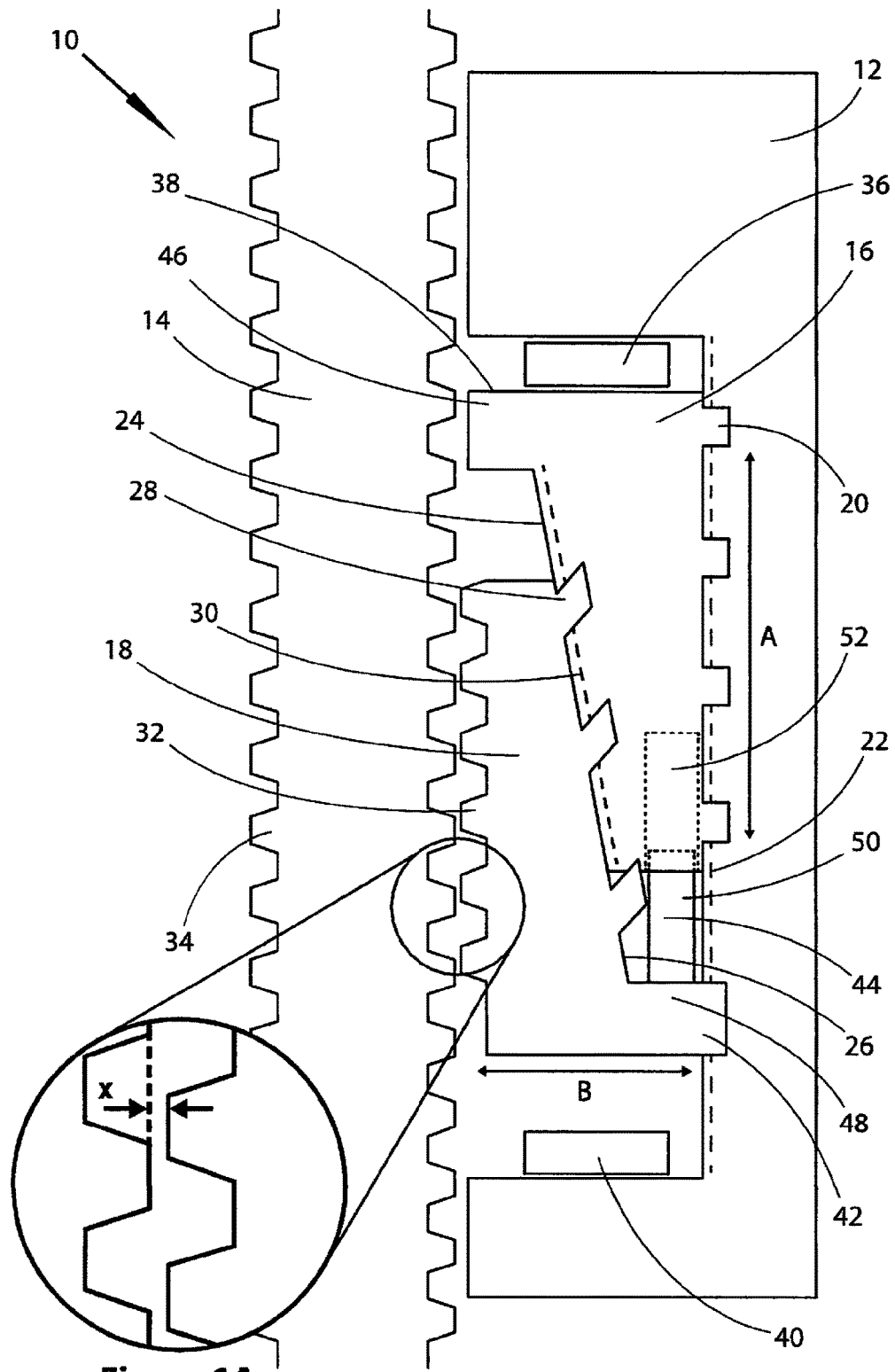
FIG. 1 is a section of an apparatus for locking a platform to a rig leg shown in a disengaged and non-aligned configuration according to a first embodiment of the present invention.
FIG. 1a is a close-up of part of FIG. 1.

FIG. 1 shows an apparatus, generally indicated by reference numeral 10, for locking an oil rig platform 12 to a rig leg 14.

The apparatus 10 comprises a driving portion 16 in the form of a driving wedge and an engaging portion 18 in the form of an engaging wedge. The driving wedge 16 is adapted to move in a first direction (indicated by arrow "A") with respect to the platform 12. The driving wedge 16 defines grips 20 adapted to engage a pair of platform slots 22 (of which one is visible, the other being on the opposite, non-visible side of the apparatus 10) defined by the platform 12 to constrain the driving wedge 16 to movement in the first direction only. The engaging wedge 18 is secured to the driving wedge 16 by engaging wedge grips 28 adapted to engage a pair of driving wedge slots 30 (of which one is visible, the other being on the opposite, non-visible side of the rack chock system 10). The driving wedge slot 30 is parallel to a tapered surface 24 defined by the driving wedge 16 and a complementary tapered surface 26 defined by the engaging wedge 18. As will be described, the wedges 16,18 can be fixed relative to one another and move as a unit, or can move with respect to one another.

Relative movement between the wedges 16,18 occurs along the tapered surfaces 24,26, this movement having a vertical component in the first direction and a horizontal component in a second direction (indicated by arrow "B"), the second direction being perpendicular to the first direction. When relative movement occurs between the wedges 16,18, the movement is constrained by the engaging wedge grips 28 moving along the driving wedge slot 30

The engaging wedge 18 further defines an engaging wedge profile 32 in the form of a plurality of teeth. The engaging wedge teeth 32 are adapted to engage with a complementary profile 34, in the form of teeth, defined by the rig leg 14. Engagement of the teeth 32,34 permits the apparatus 10 to lock the platform 12 to the rig leg 14.

The driving wedge 16 further defines a driving wedge land 46 and the engaging wedge 18 further defines a engaging wedge land 48. The purpose of these lands 46,48 will be discussed in due course.

Movement of the wedges 16,18 is controlled by a first hydraulic screw jack 36 acting on a driving wedge upper surface 38, a second hydraulic screw jack 40 acting on an engaging wedge lower surface 42, and a hydraulic controlled adjustment device 44 connecting the driving and engaging wedges 16,18.

Figures 2, 2A:
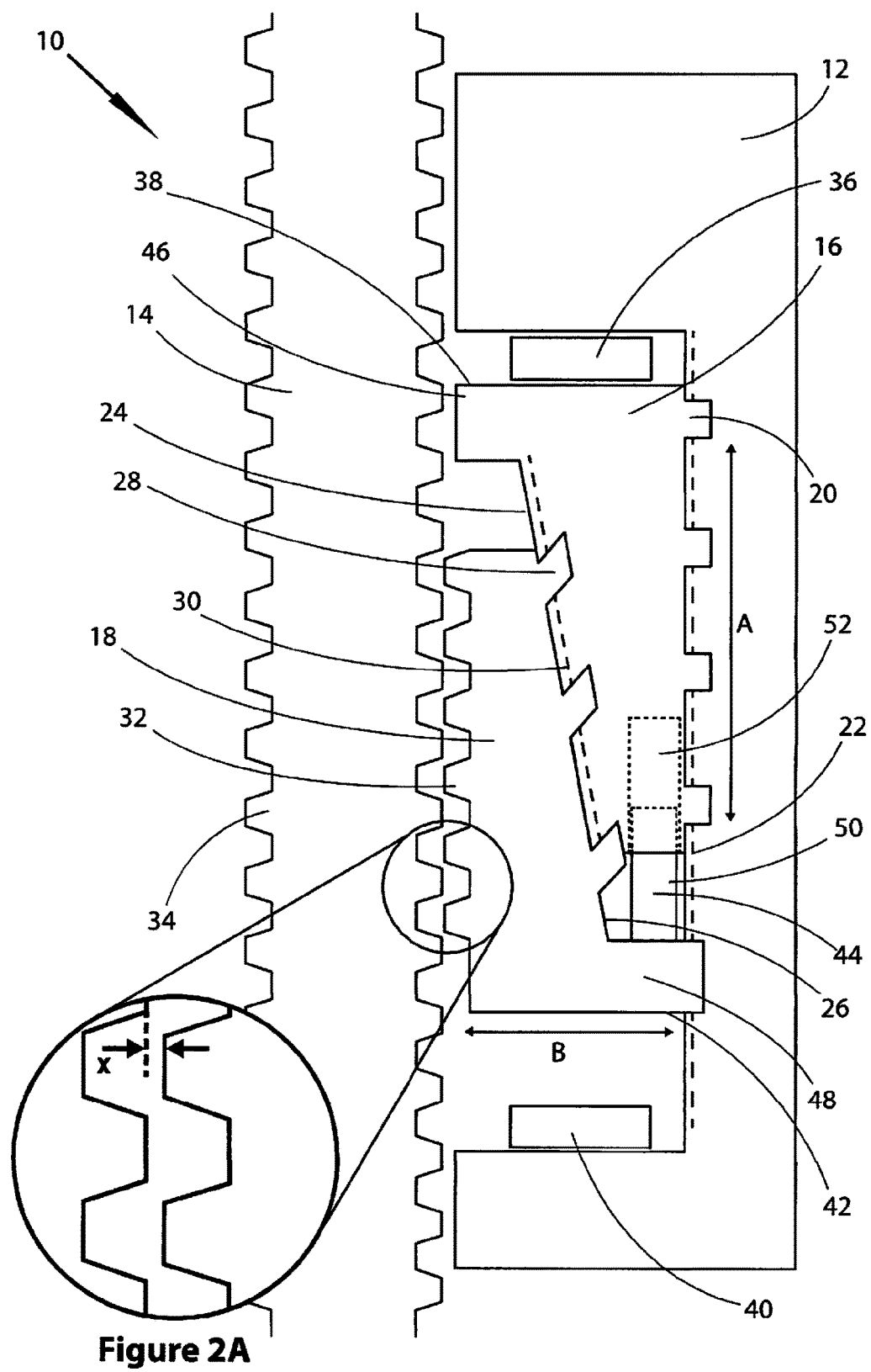
FIG. 2 is a section of the apparatus of FIG. 1 shown in a disengaged and aligned configuration.
FIG. 2a is a close-up of part of FIG. 2.
Figures 3, 3A:
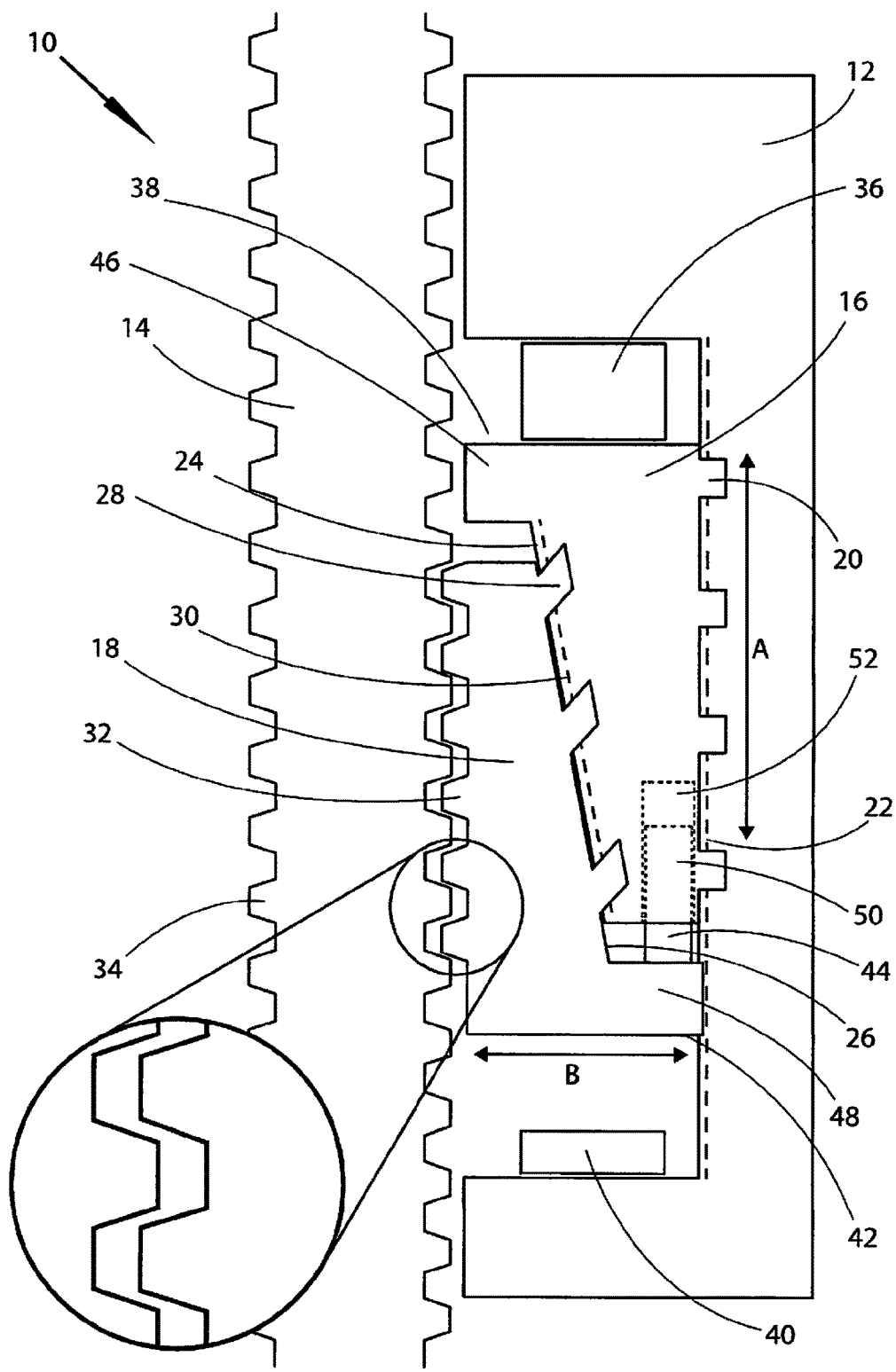
FIG. 3 is a section of the apparatus of FIG. 1 shown in a disengaged and overlapping configuration.
FIG. 3a is a close-up of part of FIG. 3.

The hydraulic controlled adjustment device 44 comprises a hydraulic piston 50 moveable with respect to the driving wedge 16 from a retracted position in which the piston 50 is fully located within a piston chamber 52 (shown in broken outline) defined by the driving wedge 16 (best seen in FIG. 5) and an extended position in which the piston 50 has reached its maximum stroke and the piston 50 is extended beyond the piston chamber 52 (not shown in the drawings but a number of interim piston 50 positions between the retracted and extended positions are shown in FIGS. 1,2 and 3.)

The principal method of operation of the apparatus 10 is in three stages. The the first stage is to align the teeth 32,34 whilst maintaining a horizontal separation between the teeth 32, 34. Referring to FIGS. 1 and 1a, there is a horizontal separation between the engaging wedge teeth 32 and the leg chord teeth 34 (indicated by "X" on FIG. 1A) however the teeth 33,34 are not aligned.

This is corrected by moving the adjustment piston 50 towards the retracted position until alignment is achieved (shown in FIGS. 2 and 2A). Moving the piston 50, in this stage of the operation, moves the engaging wedge 18 with respect to the driving wedge 16, the platform 12 and the rig leg 14.

With the teeth 32,34 aligned the next stage of the operation is to close the horizontal separation so the teeth 32,34 overlap but don't necessarily touch. In this stage of the operation, the upper hydraulic screw jack 36 is activated to move the driving wedge 16 downwards in the first direction. Simultaneously, the piston 50 retracts into the piston chamber by an equal amount, maintaining the alignment of the teeth 32,34, that is the piston 50 maintains the vertical position of the engaging wedge 18. However the interaction of the wedge tapered surfaces 24,26 moves the engaging wedge 18 in the second direction such that the teeth 32,34 overlap, shown in FIG. 3A.

Figures 4, 4A:
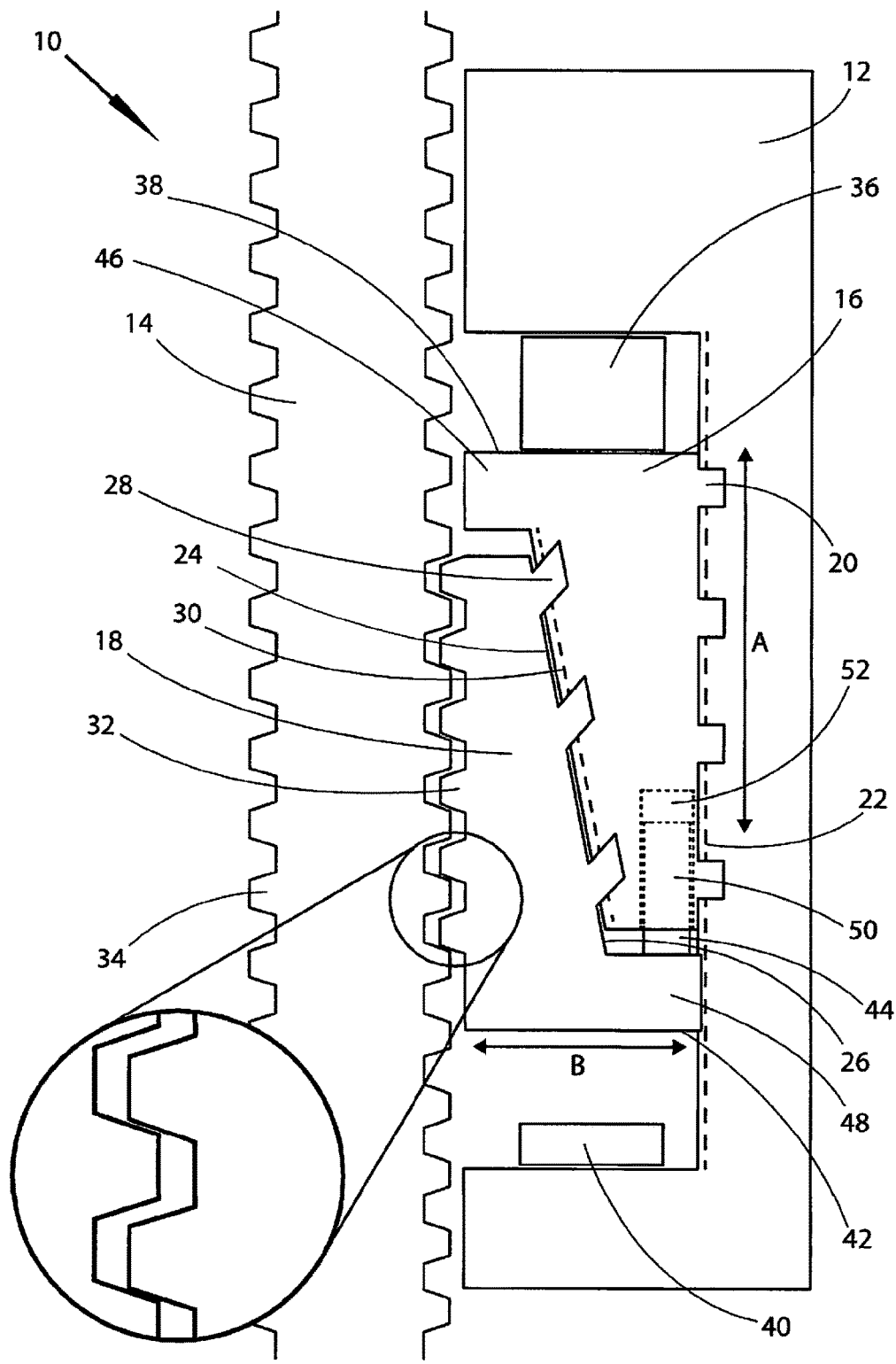
FIG. 4 is a section of the apparatus of FIG. 1 shown in an engaged and partially meshed configuration.

Once the teeth overlap, the hydraulic pressure on the piston 50 can be released and the third stage of setting commences using just the upper hydraulic screw jack 36 moving the driving wedge 16 downwards in the first direction. This will move the engaging wedge 18 in the first direction until the engaging wedge teeth 32 and the leg chord teeth 34 engage (FIGS. 4 and 4A).

Figures 5, 5A:
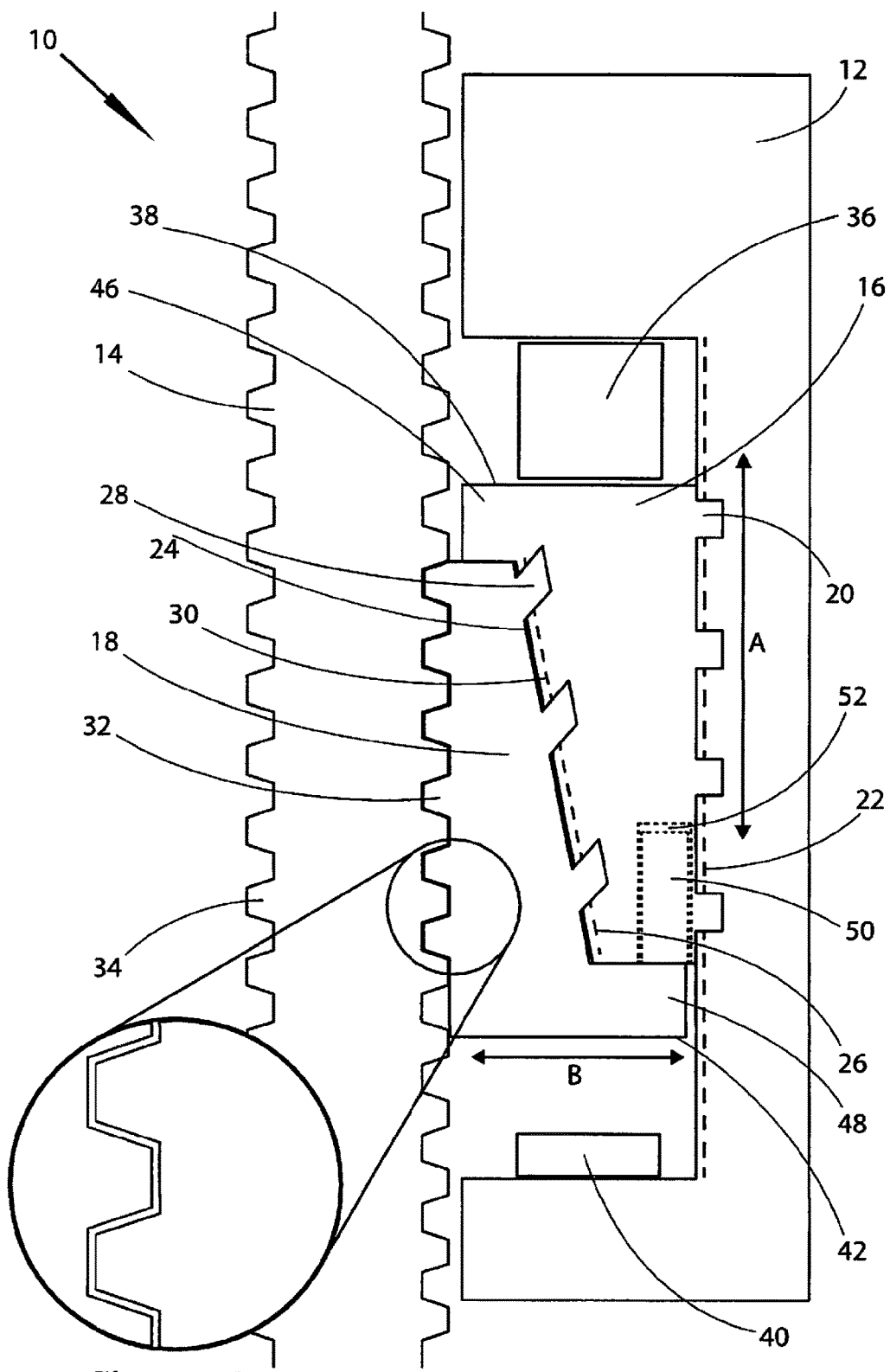
FIG. 5 is a section of the apparatus of FIG. 1 shown in an engaged and fully meshed configuration.
FIG. 5a is a close-up of part of FIG. 5.

Continued movement of the engaging wedge 18 by the driving wedge 16 in the first direction will be prevented by the leg chord teeth 34 causing further interaction of the wedge tapered surfaces 24,26 moving the engaging wedge teeth 32 and the leg chord teeth 34 in to full mesh (FIGS. 5 and 5A).

Figure 6:
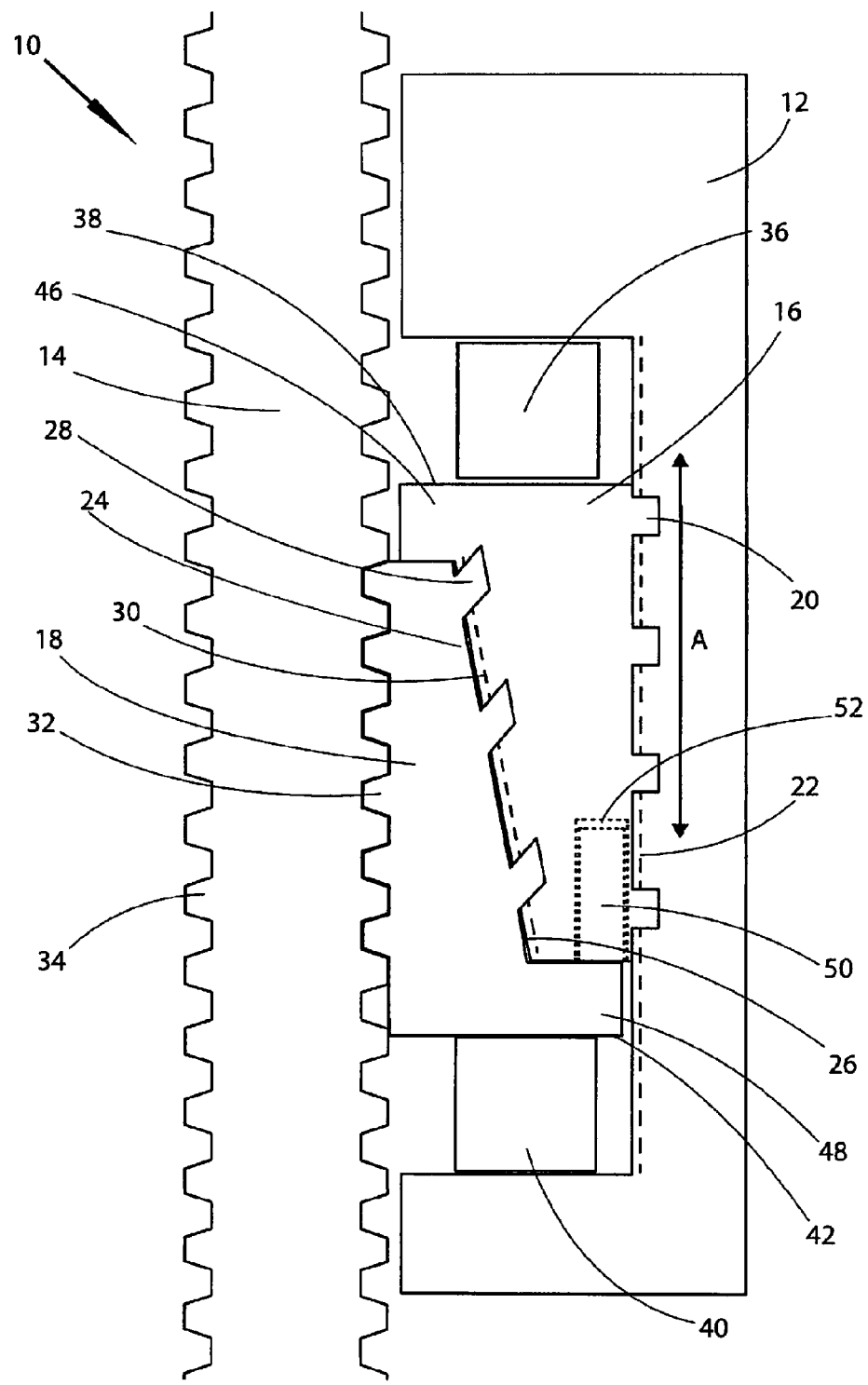
FIG. 6 is a section of the apparatus of FIG. 1 shown in a locked configuration.

The platform 12 is now fully locked to the rig leg 14. Additionally the engaging wedge 18 has engaged with the driving wedge land 46 and the driving wedge 16 has engaged with the engaging wedge land 48, preventing further relative movement between the wedges 16,18. In FIG. 6 the lower hydraulic screw jack 40 is brought into engagement with the engaging wedge lower surface 42, to fully lock the apparatus 10.

Figure 7:
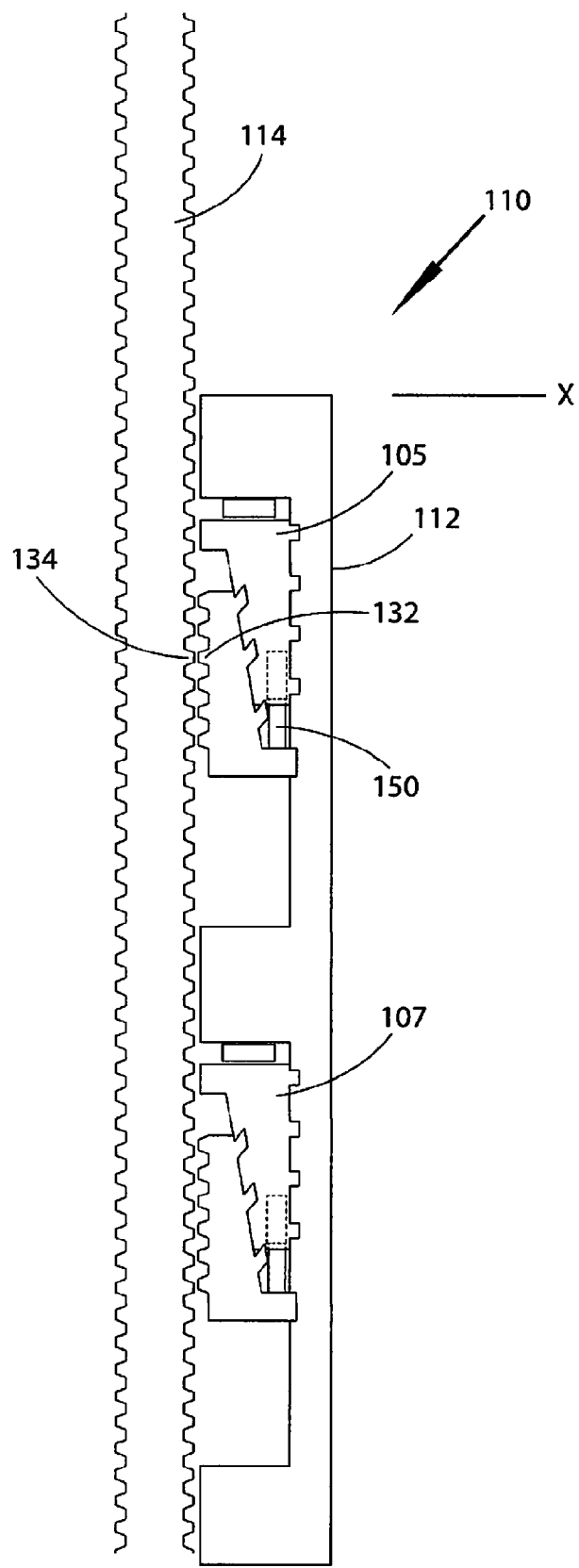
FIG. 7 is a section of a system for jacking a platform up a rig leg shown in a fully disengaged configuration according to a second embodiment of the present invention.

The apparatus 10 can also be used as part of a system to move the platform 12 with respect to the rig leg 14. A system 110 which achieves this is shown in FIG. 7, a section of a system 110 for jacking a platform 112 up a rig leg 114, the system 110 shown in a fully disengaged configuration.

The system 110 comprises an upper apparatus 105 and the lower apparatus 107 which are substantially identical to the apparatus 10 of the first embodiment.

The use of two apparatus 105, 107 allows the platform 112 to be elevated up the rig leg 114 from the current level indicated by the letter "X" to a higher level.

The operation of the system 110 will now be described.

Figure 8:
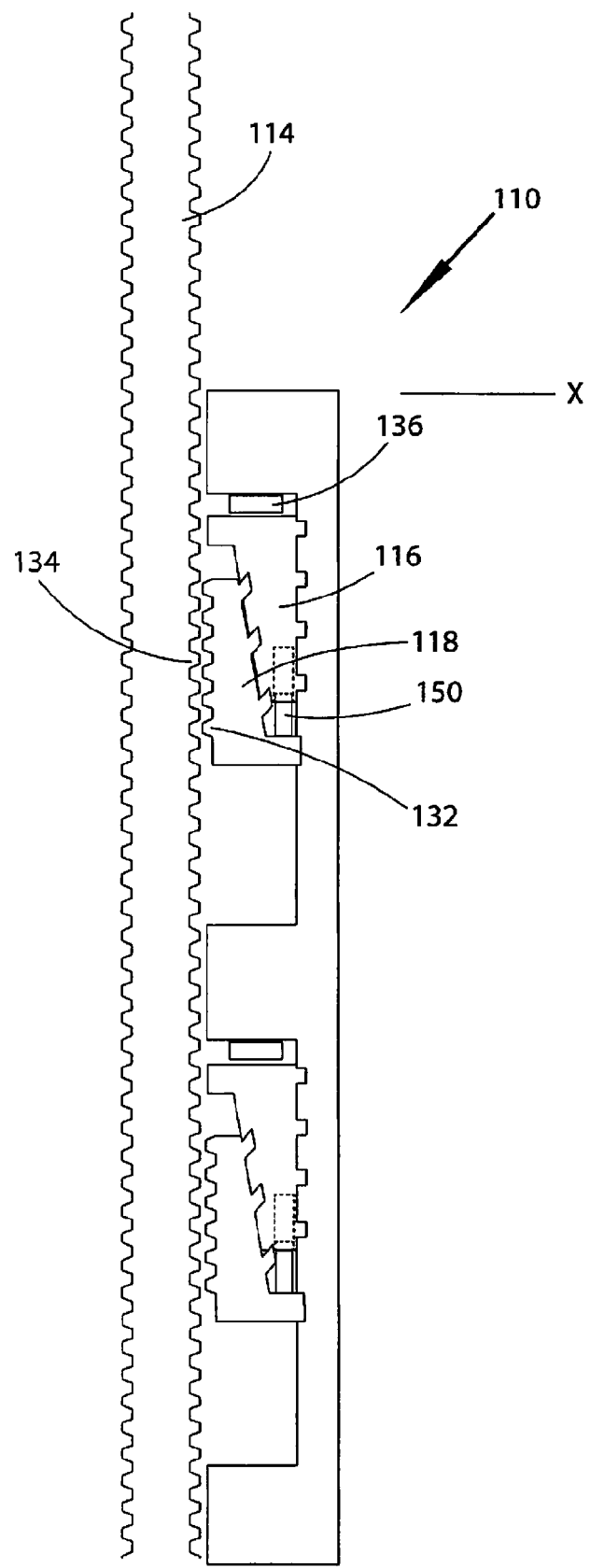
FIG. 8 is a section of the system of FIG. 7 shown in an aligned configuration.

As can be seen from FIG. 7, the engaging wedge teeth 132 are out of alignment with the rig leg teeth 134. The teeth 132, 134 are brought into alignment by the adjustment piston 150, as previously described. This position is shown in FIG. 8, a section of the system 110 of FIG. 7 shown in an aligned configuration.

Figure 9:
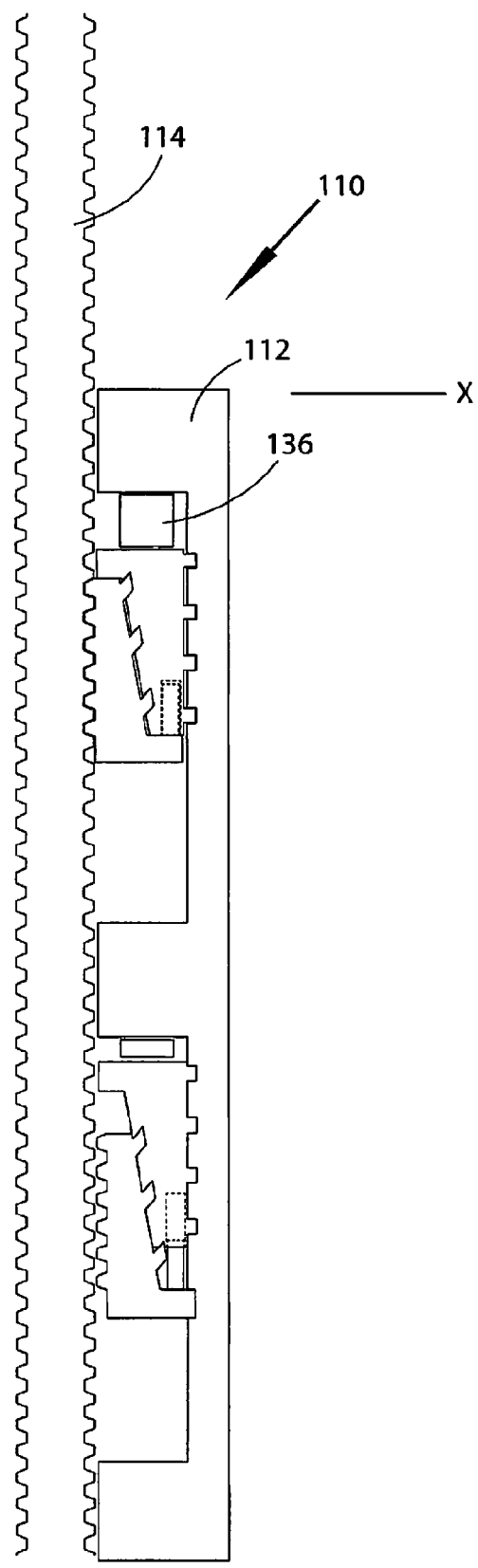
FIG. 9 is a section of the system of FIG. 7 shown in an engaged configuration.

In jacking systems, instead of screw jacks 36, hydraulic cylinders 136, 236 would be preferred due to speed of movement. The upper apparatus hydraulic cylinder 136 drives the driving wedge 116 downwards, the movement in the downwards direction of the driving wedge 116 being compensated for by the adjustment piston 150, resulting in movement of the engaging wedge 118 towards the rig leg 114 to bring the teeth 132, 134 into engagement. This position shown in FIG. 9, a section of the system 110 of FIG. 7 shown in an engaged configuration.

To jack the platform 112 up to a higher level, further downward pressure is applied by the upper apparatus hydraulic cylinder 136. As the rig leg 114 is firmly fixed on the seabed (not shown) the force applied by the upper apparatus hydraulic screw jack 136 causes the platform 112 to lift, relative to leg 114, raising the platform 112, for example, above the sea surface.

Figure 10:
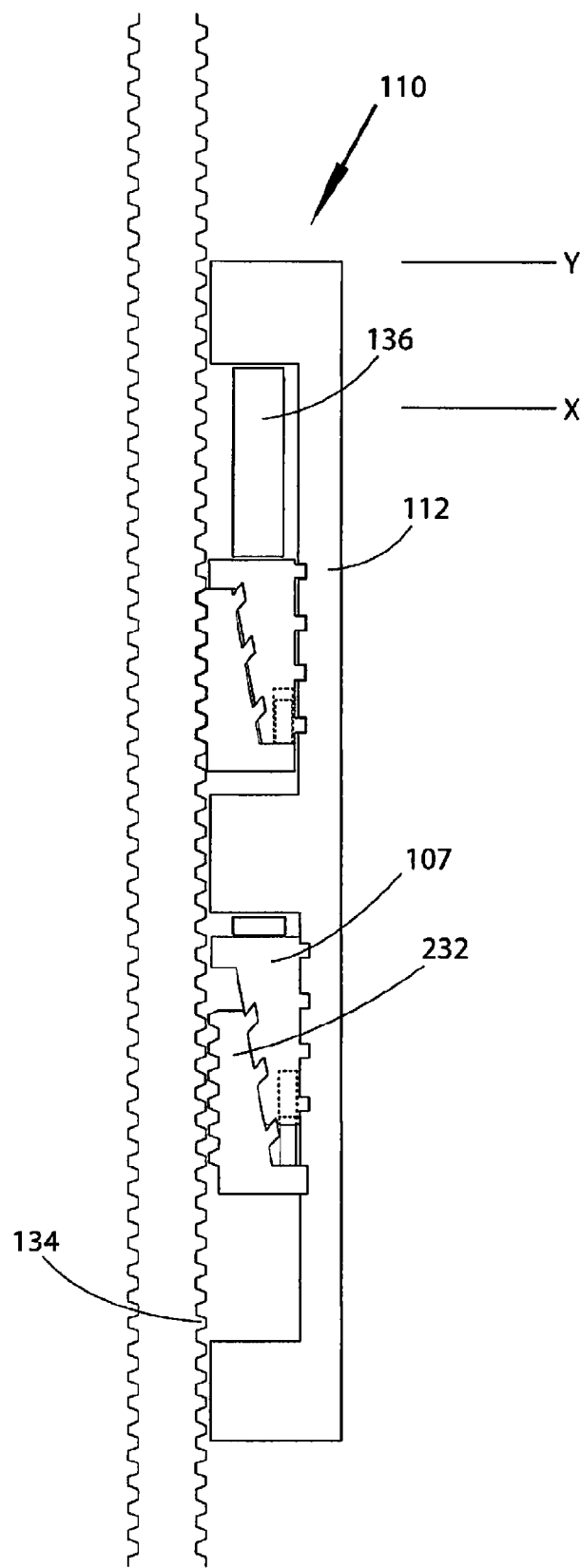
FIG. 10 is a section of the system of FIG. 7 shown in a first elevated configuration.

Referring to FIG. 10, a section of the system 110 FIG. 7 shown in a first elevated configuration, the upper apparatus hydraulic cylinder 136 has reached the extent of its travel and the platform 112 has been lifted to a first elevated level indicated by the letter "Y".

Figure 11:
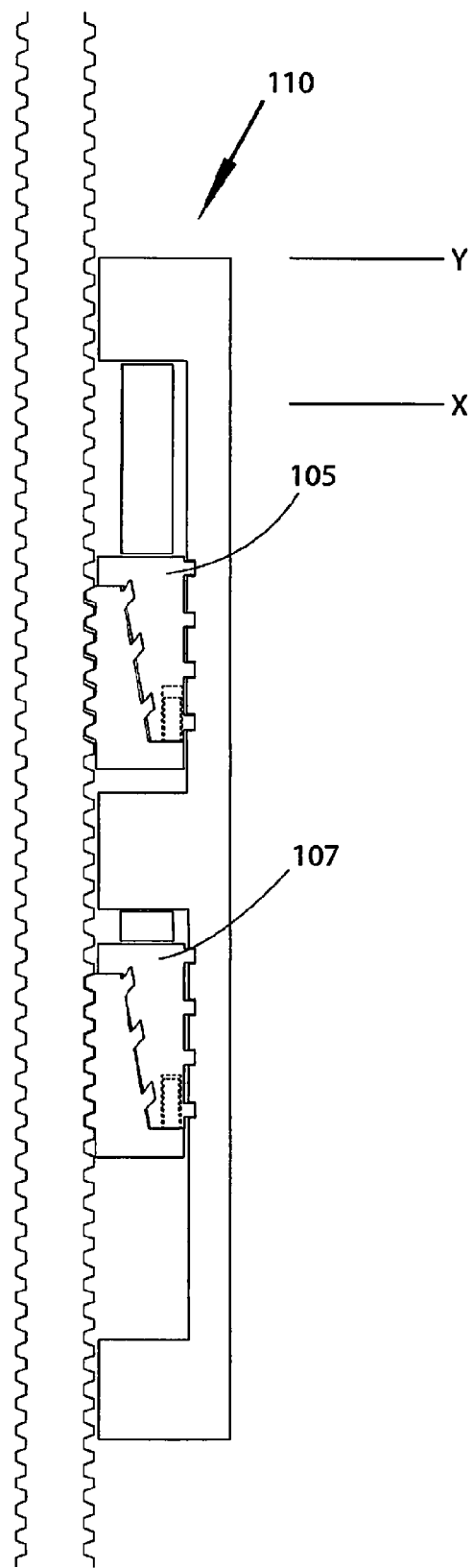
FIG. 11 is a section of system of FIG. 7 shown in a further engaged configuration.
Figure 12:
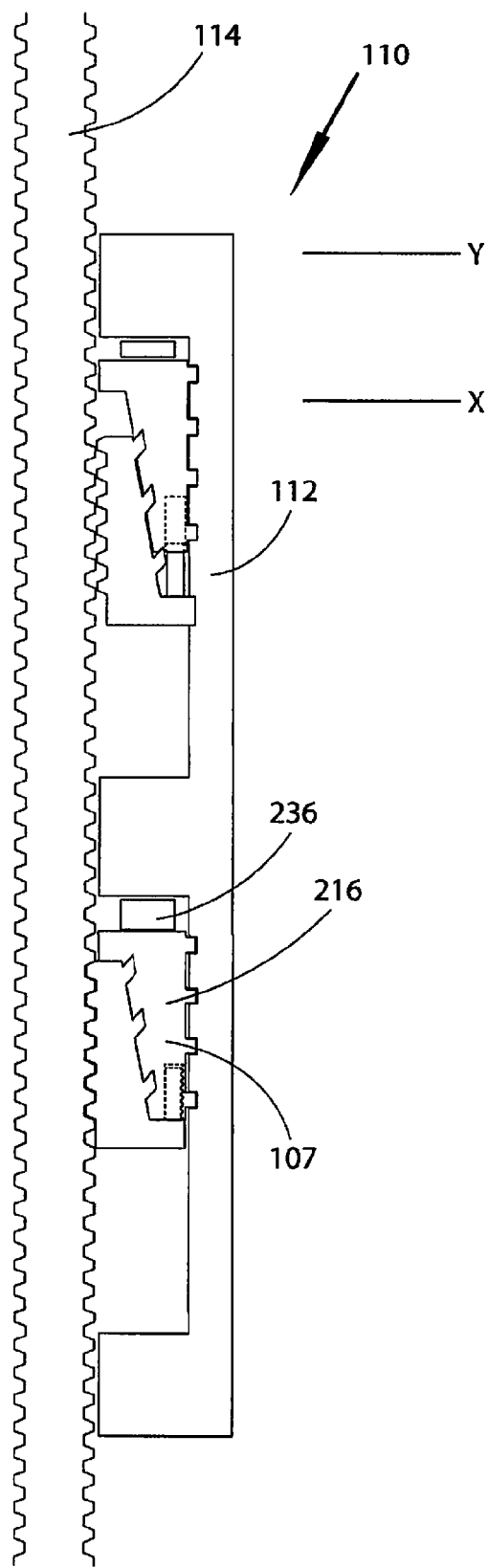
FIG. 12 is a section of the system of FIG. 7 shown in a still further engaged configuration.
Figure 13:
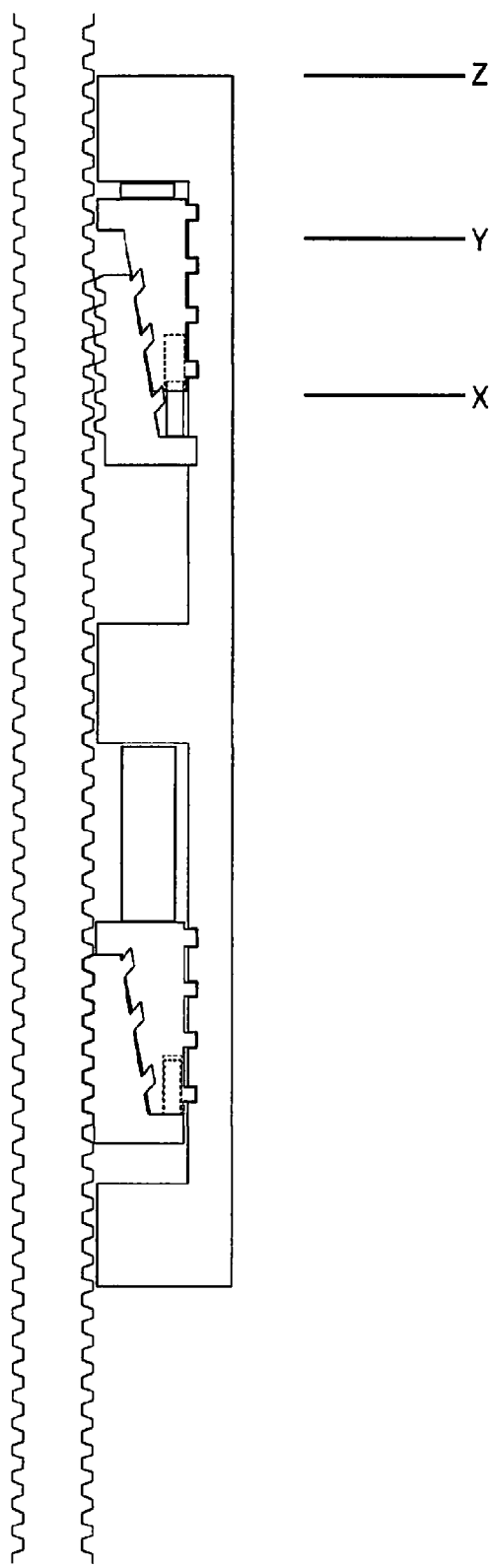
FIG. 13 is a section of the system of FIG. 7 shown in a second elevated configuration.

At this point the lower apparatus 107 is adjusted to bring the engaging wedge teeth 232 into alignment and subsequent engagement with the rig leg teeth 134. This position is shown in FIG. 11, a section of the system 110 of FIG. 7, shown in a further engaged configuration. Once the lower apparatus 107 is engaged, the upper apparatus 105 can be disengaged safely, the weight of the platform 112 being taken by the lower apparatus 107. Once the upper apparatus 106 is disengaged, as shown in FIG. 12, a section of the system 107 FIG. 7 shown in a still further engaged configuration, the lower apparatus hydraulic cylinder jack 236 applies a downward force on the driving wedge 216 creating movement of the platform 112 with respect to the leg 114, causing the platform 112 to rise further to a second elevated position, indicated by letter "Z" on FIG. 13, a section of the system of FIG. 7 shown in a second elevated configuration.

By utilising this feature of the apparatus 10 of the first embodiment, as well as locking first body with respect to a second body, multiple apparatus can be used in the system in which they cooperate to create a jacking mechanism.

Various modifications and improvements may be made to the above described embodiment without departing from the scope of the present invention.

The invention claimed is:

1. An apparatus for engaging a first body to a second body, the apparatus comprising:
   a driving portion attachable to the first body and adapted to be moveable in a first direction, the first direction being parallel, in use, to a second body longitudinal axis;
   an engaging portion moveably attached to the driving portion, such that movement of the driving portion results in movement of the engaging portion, the engaging portion defining an engaging profile, the engaging profile adapted to engage a complementary profile on the second body; and
   an adjustment device connecting the driving portion to the engaging portion, the adjustment device being adapted to move the engaging portion independently of the driving portion.

2. An apparatus according to claim 1 wherein the adjustment device is adapted to restrict movement of the engaging portion to movement along a particular axis.

3. An apparatus according to claim 1 wherein the driving portion is adapted to engage the engaging portion, the driving portion being adapted to engage the engaging portion at an apparatus interface.

4. An apparatus according to claim 3 wherein the driving portion defines a driving portion tapered surface, the engaging portion defines an engaging portion tapered surface and the driving portion tapered surface and the engaging portion tapered surface are adapted to engage to define the apparatus interface.

5. An apparatus according to claim 4 wherein the portion tapered surfaces are adapted to engage such that movement of the driving portion in the first direction results in movement of the engaging portion in a second direction, the first direction being different to the second direction.

6. An apparatus according to claim 4 wherein the driving portion tapered surface and the engaging portion tapered surface are planar.

7. An apparatus according to claim 4 wherein the driving portion tapered surface and the engaging portion tapered surface are parallel planes.

8. An apparatus according to claim 4 wherein at least one of the driving portion tapered surface and/or the engaging portion tapered surface defines a surface profile.

9. An apparatus according to claim 8 wherein the/each surface profile defines one or more passageways.

10. An apparatus according to claim 3 wherein the adjustment device is adapted to prevent movement of the engaging portion in the first direction.

11. An apparatus according to claim 1 wherein the driving portion defines a land adapted to be engaged by the engaging portion.

12. An apparatus according to claim 1 wherein the engaging portion defines a land adapted to be engaged by the driving portion.

13. An apparatus according to claim 1 wherein the engaging portion and/or the driving portion define a recess adapted to receive the adjustment device.

14. An apparatus according to claim 1 wherein the adjustment device is adapted to move between a retracted position and an extended position.

15. An apparatus according to claim 14 wherein movement from the retracted position to the extended position is along an axis parallel to the first direction.

16. An apparatus according to claim 1 wherein the driving portion is moveable with respect to the first body by means of a first force application device.

17. An apparatus according to claim 16 wherein the first force application device is applied to the driving portion until the engaging portion profile has fully engaged with the second body complementary profile.

18. An apparatus according to claim 16 wherein the first force application device is applied to the driving portion until a driving portion land and an engaging portion land are engaged with the engaging portion and driving portion respectively.

19. An apparatus according to claim 1 wherein the apparatus comprises a second force application device, the second force application device being engageable with the engaging portion.

20. An apparatus according to claim 19 wherein the second force application device is engageable with the engaging portion.

* * * * *